Figure 1:
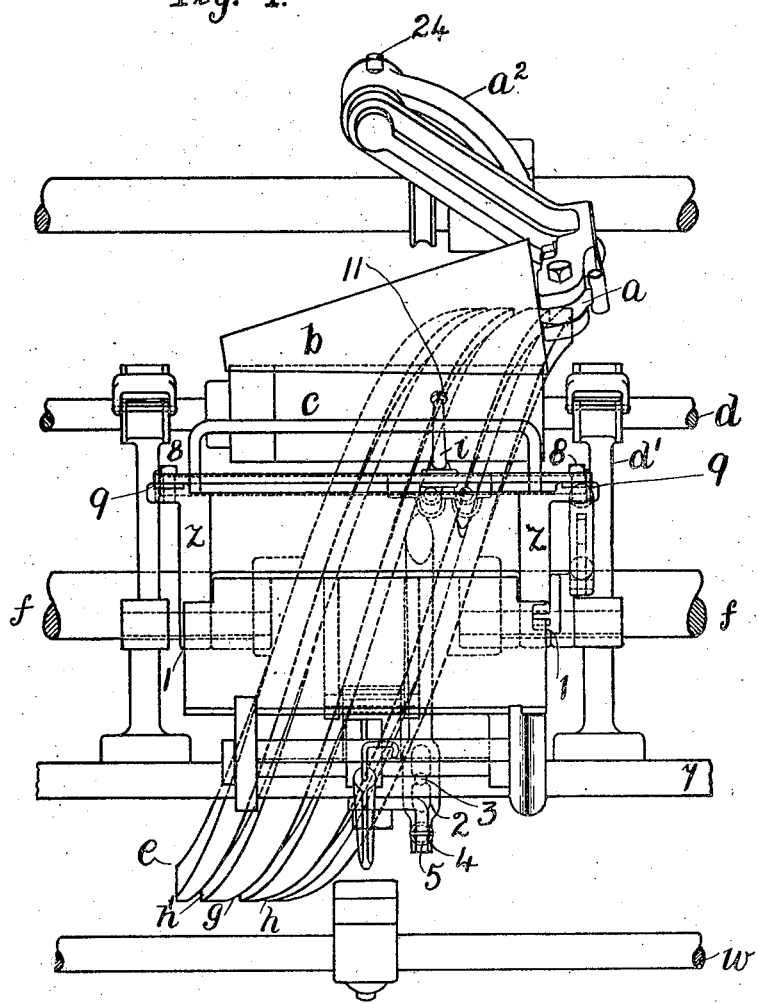

F. A. HOLT AND G. KERSHAW.
WINDING MACHINE.
APPLICATION FILED NOV. 10, 1916.

1,353,475.

Patented Sept. 21, 1920.
4 SHEETS—SHEET 1.

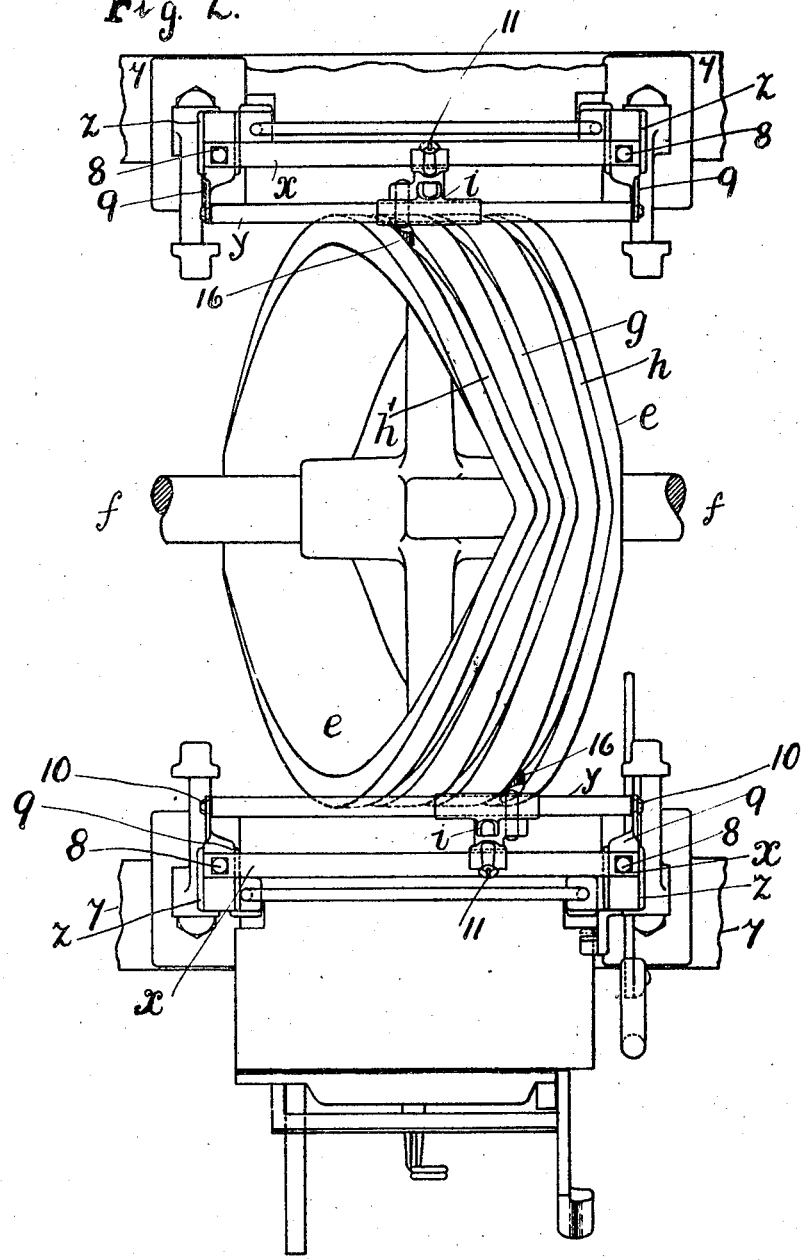

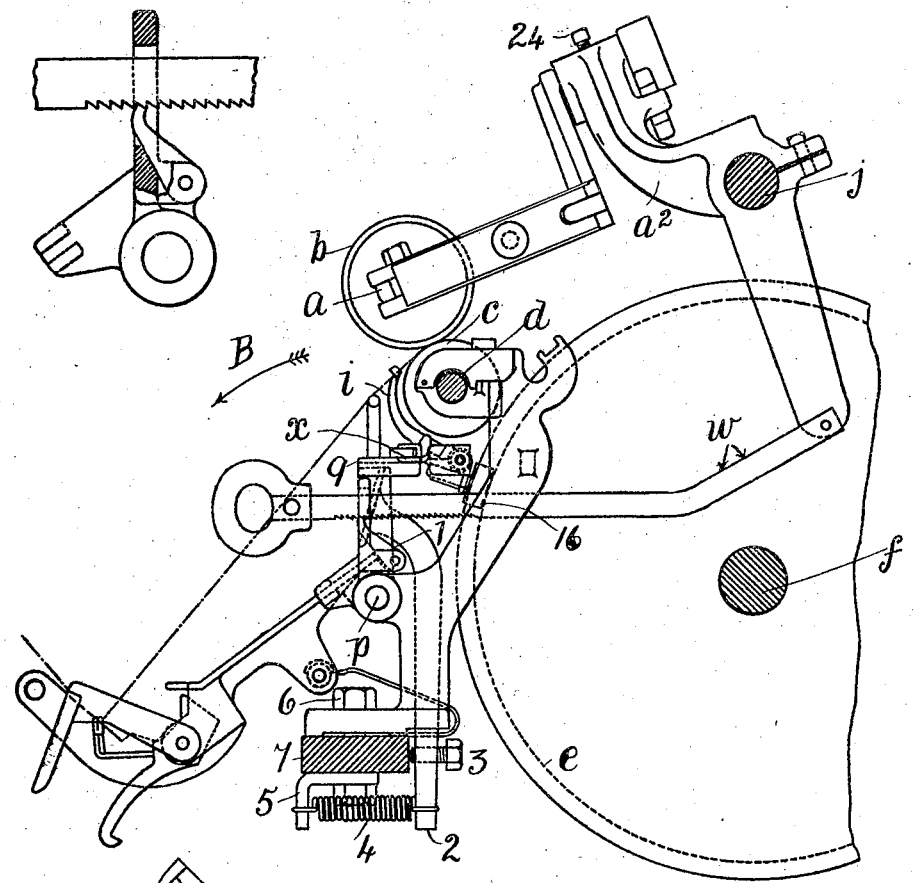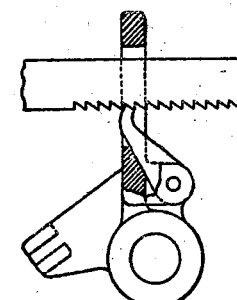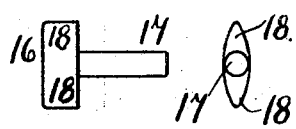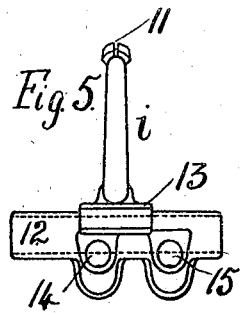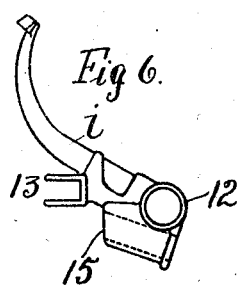

F. A. HOLT AND G. KERSHAW.
WINDING MACHINE.
APPLICATION FILED NOV. 10, 1916.
1,353,475. Patented Sept. 21, 1920.
4 SHEETS—SHEET 4.
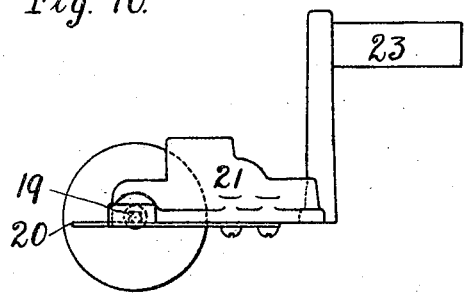
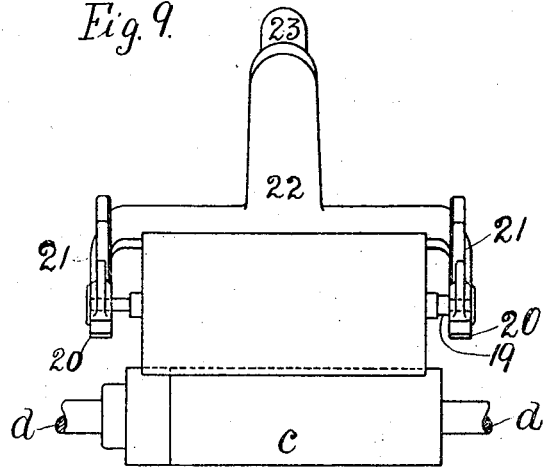

UNITED STATES PATENT OFFICE.

FRANK ASHWORTH HOLT, OF ROCHDALE, AND GRINDROD KERSHAW, OF WHITWORTH, ENGLAND, ASSIGNORS, BY MESNE ASSIGNMENTS, TO FOSTER MACHINE COMPANY, OF WESTFIELD, MASSACHUSETTS, A CORPORATION OF MASSACHUSETTS.

WINDING-MACHINE.

1,353,475.  Specification of Letters Patent.  Patented Sept. 21, 1920.

Original application filed August 24, 1915, Serial No. 47,182. Divided and this application filed November 10, 1916. Serial No. 130,552.

*To all whom it may concern:*

Be it known that we, FRANK ASHWORTH HOLT, a subject of the King of the United Kingdom of Great Britain and Ireland, and resident of Noon Sun House, Whitworth Road, Rochdale, in the county of Lancaster, England, and GRINDROD KERSHAW, a subject of the King of the United Kingdom of Great Britain and Ireland, and resident of 62 Market street, Whitworth, in the county of Lancaster, England, have invented a new and useful Improvement in Winding-Machines, of which the following is a specification.

This application is a division of my application filed Aug. 24, 1915, Serial No. 47,182, which is now Patent No. 1,215,025, dated Feb. 6, 1917.

This invention relates to winding machines in which in order that conical or cylindrical packages may be wound in one machine either at different times or in the case of a machine with more than one winding head either at different times or simultaneously in different parts, the cam for working a thread guide is provided with more than one cam track and the object of this invention is to make much easier, simpler and quicker than they have hitherto been, changes from or to the winding of a cylindrical package to or from the winding of a conical package and to obviate the disturbance and loss of accuracy in adjustments scarcely avoidable in the changes of thread guides and their connection with different cam tracks in machines of this kind heretofore constructed in which different thread guides are provided to be brought into connection with the different cam tracks when changes are made from or to the winding of cylindrical packages to or from the winding of conical packages.

This invention consists in devices by which the change to or from the winding of a cylindrical package from or to the winding of a conical package can be effected by a thread guide being taken out of connection with one cam track and brought into connection with another cam track while the parts on which the thread guide is movable remain mounted in the winding machine.

Other parts of the invention are pointed out hereinafter and in the claims following.

In the accompanying drawings in which the same letters and numerals indicate corresponding parts in all figures, an illustrative embodiment of this invention are shown.

In the drawings, Figure 1 is a front elevation of part of a winding machine, showing one winding head, Fig. 2 is a plan of part of a winding machine showing parts of two winding heads and one cam serving for working the traversing thread guides of both heads. Fig. 3 is a side elevation partly in vertical section through part of a winding machine and shows one winding head in side elevation. Some of the parts shown in Figs. 1, 2 and 3 are shown in only one or two of such figures and omitted from the others or other so that other parts may be shown more clearly. Fig. 4 is a side elevation partly in vertical section showing on a larger scale a pawl shown in Fig. 3 and parts carrying and used with it. Figs. 5 and 6 are respectively a front and side elevation drawn on a larger scale than Figs. 1, 2 and 3 and showing a traversing thread guide. Figs. 7 and 8 are respectively a side view and end view of a die used with a traversing guide.

Fig. 9 is a front elevation of a holder for use in winding cylindrical packages and the arm in which it is mounted for use and the driving roll and Fig. 10 is a side elevation of such holder and arm.

In the drawings many of the parts shown are of well known construction being very similar to parts shown in the drawings of United States Letters Patent No. 952,015 dated March 15th 1910 granted to John Oliphant McKean and will be described herein in so far as is convenient to facilitate the description of the parts provided according to this invention but it is to be understood that the parts provided according to this invention are applicable to winding machines of other kinds in which they may be desirable.

In the drawings $a$ is a holder of ordinary construction to receive a conical tube or shell $b$ on which a package of yarn or thread may be wound. $c$ is a driving roll mounted fast upon a shaft $d$ extending lengthwise of the machine and revolved by any suitable means. *e* is a cam mounted fast upon a shaft *f* extending lengthwise of the machine and revolved by any suitable means shown as provided with three cam tracks *g*, *h*, *h*¹ formed as grooves in a way usual to work two thread guides *i* one at each side of the machine so as to serve for two winding heads the outer cam track *h*, *h*¹ being used in winding conical packages and the central cam track *g* being used in winding cylindrical packages.

According to this invention the thread guide of the or each head of a winding machine is mounted in and movable to and fro along a guide carrier which, serving alone to support and to guide the thread guide, is itself movable as a whole toward and away from the cam used with such thread guide and is mounted on a support movably mounted in the machine and allowing the guide carrier to be moved as a whole toward and away from the cam while remaining mounted in the machine, and enables the die by which the thread guide is made to engage the cam to be moved to and from the cam and so to be disengaged from one cam track of the cam and be moved into engagement with another cam track thereof while the whole guide carrier and the thread guide remain mounted in the machine and means are provided by which when the die of the thread guide has been put into position to be engaged with a cam track appropriate to the kind of package to be wound it may be moved into and held in engagement therewith until it is required to be moved into engagement with another cam track for the formation of another kind of package. For the purpose of and according to this invention also the thread guide of the or each winding head is provided in a preferred construction with a plurality of places usually two for the die by which it is made to engage the cam used with it in order that when engaged with any cam track of the cam it may be in proper relation to the spindle or holder around which a package is to be wound.

For simplicity description will be given of the means for supporting and guiding one thread guide though any number of similar means may be provided in accordance with the number of winding heads in a machine.

In the construction illustrated in the drawings, guide bars *x y* to support and guide the thread guide *i* in its traversing movement are mounted on a frame *z* with arms 1 to embrace the studs *p* on which the lever frame or apron *q* of the stop motion is pivoted and with an arm 2 extending downward to carry an adjustable stop 3 and to receive connection of a spring 4 attached at its other end to a bracket 5 secured by the bolt 6 and the nut thereon to a rail 7 forming part of the framework of the machine. The frame *z* is movable about the studs *p* independently of the lever frame or apron *q* and ordinarily the spring 4 which is in tension holds the adjustable stop 3 which is shown as a set-screw against the rail 7 in order to determine the position of the frame *z* and the path of the thread guide *i* but leaves the frame *z* free to be moved about the studs *p* in the direction indicated by the arrow B when the thread guide *i* is to be disconnected from the cam *e*. The guide bar *x* is shown as of rectangular transverse section and adapted to be secured at each end to the frame *z* by screws 8 which also serve to hold in grooves in the frame *z* socket plates 9 with conical sockets 10 in which the guide bar *y* which is in the form of a cylindrical rod having conical ends to be inserted in the sockets 10, is mounted. The frame *z* and socket plates 9 are so formed that the guide bars *x y* are parallel to one another and to the axis of the driving roll *c*. The thread guide *i* which is provided in the usual way with a notch 11 for guiding yarn is provided with a tubular part 12 to surround and to be slid upon the guide bar *y* and with a forked part 13 to embrace and to be slid upon the guide bar *x* and the thread guide *i* is fitted to the guide bars *x y* so as to be guided thereon with sufficient accuracy but also to be movable along them with sufficient freedom. The thread guide *i* is provided with two sockets 14, 15 in one or other of which a die 16 provided with a cylindrical shank 17 to fit the sockets 14, 15 and a shoe 18 tapering toward each end to be engaged with a cam track of the cam *e* may be pivoted. The shank 17 of the die 16 is inserted in the socket 14 when it is to be engaged with the central cam track *g* of the cam *e* for a cylindrical package to be wound and in the socket 15 when it is to be engaged in the adjacent right hand track *h* of the cam *e* for a conical package to be wound. The sockets 14, 15 are formed in such positions relatively to the guide notch 11 that when the die 16 is in the socket 14 and engaged with the adjacent right hand cam track *h* for the winding of a conical package the guide notch 11 shall be traversed to and fro in a path in proper position relatively to the roll *c* and holder *a* or a conical package thereon and that when the die 16 is in the socket 15 and engaged with the cam track *g* for the winding of a cylindrical package the guide notch 11 shall be traversed to and fro in a path still in proper position relatively to the roll *c* and the holder 19 or cylindrical package upon it.

The holder 19 for use in winding cylindrical packages is of ordinary form comprising a spindle revolubly mounted and held by springs 20 against accidental escape in notches in the lateral extensions 21 of an arm 22 furnished with a shank 23 adapted to be inserted and secured in the arm $a^2$ when the holder $a$ is removed therefrom. In the case illustrated a set screw 24 is used for securing the shank 23 in the arm $a^2$ and removed or slacked back when the holder $a$ is put into use.

The die 16 when in engagement with either of the cam tracks $g$ $h$ provided for it is moved by the cam $e$ similarly to thread guides of the usual construction and arrangement, and the holder $a$ or holder 19 being brought into use according as conical or cylindrical packages are to be wound will also work similarly to the like parts of machines of the usual construction and arrangement. When change is to be made from or to the winding of a cylindrical package to or from the winding of a conical package the changes requisite of either of the holders $a$ and 19 for the other and the tubes or the like on which yarn is to be wound are made in the ordinary way and the frame $z$ is moved about the pivots $p$ in the direction indicated by the arrow B so that the thread guide $i$ is withdrawn so far from the cam $e$ that the die 16 can be disengaged from the cam track $g$ or $h$ in which it may be at the time and when the thread guide $i$ being pushed along the bars $x$ $y$ to a convenient position the die 16 is moved from the one socket 14 or 15 to the other and then the die 16 is brought opposite to the other cam track $h$ or $g$ and is brought into engagement therewith by the frame $z$ being allowed to be moved back by the spring 4 and then winding may proceed. The change of the die 16 from one of the sockets 14, 15 to the other and from the central cam track $g$ to the adjacent right hand cam track $h$ or the reverse change is thus accomplished without any other part than the die 16 being dismounted from the machine and the frame $z$ being simply moved from and allowed to be moved by the spring 4 back to the position determined by the adjustable stop 3 the guide bars $x$ $y$ are always brought back automatically into proper position for winding to proceed.
In the construction hitherto provided the change from or to the winding of cylindrical packages to or from the winding of conical packages has been effected by the change of thread guides and has involved the dismounting of one of more of the guide bars or other parts on or in which the thread guides are mounted for use and in the dismounting of such parts there has been involved the practical impossibility of putting them back accurately into their previous positions. The die 16 having a cylindrical shank and the sockets 14, 15 to receive it being cylindrical the removal of the die 16 from one of the sockets 14, 15 to the other and its restoration to the socket in which it may first have been placed for use, involves no possibility of derangement of adjustments.

Changes may be made in the details of the device provided according to this invention within the limits of the claims following and such devices may be applied in winding machines of different kinds to which they may be applicable and in particular I would have it clearly understood that although the provision of a plurality of places by which a thread guide may be engaged with the cam tracks of a cam having a plurality of cam tracks is a preferred construction a single place of connection is possible in any case in which displacement of the path traversed by the thread guide brought about by change from one cam track to another may be considered allowable as for example in cases in which tubes or spools considerably longer than the packages wound upon them are employed.

What we do claim as our invention and desire to secure by Letters Patent is:—

1. In a winding machine, a holder whereon material may be wound, means for supporting the holder, a cam having a plurality of cam tracks for moving a thread guide for guiding material to a holder, a thread guide having a plurality of places for receiving a connecting device for connecting it with the cam, a connecting device applicable to any of such plurality of places and in one or another of the cam tracks of the cam, and a guide carrier for supporting and guiding the thread guide, whereby the thread guide can be used at different times in winding material into different forms.

2. In a winding machine, a holder whereon material may be wound, means for supporting the holder, a cam having a plurality of cam tracks for moving a thread guide for guiding material to a holder, a thread guide having a plurality of places for receiving a connecting device for connecting it with the cam, a guide carrier which, serving alone to support and to guide the thread guide, is movable as a whole toward and away from the cam, a support for such carrier movably mounted in a machine and allowing the guide carrier to be moved as a whole toward and away from the cam about an axis while remaining mounted in the machine, and means for holding the support for the guide carrier in and restoring it to its ordinary position whereby the whole guide carrier remains mounted in the machine during change of the engaging means of the thread guide from one cam track of the cam to another at different times for material to be wound into different forms.

3. In a winding machine, a holder whereon material may be wound, means for supporting the holder, a cam having a plurality of cam tracks for moving a thread guide for guiding material to a holder, a thread guide provided with a plurality of places of attachment for a die, a die for attachment at one or other of such places and to engage one or another of the cam tracks of the cam and a guide carrier for supporting and guiding the thread guide whereby the thread guide can be used at different times in winding material into different forms.

4. In a winding machine, a holder whereon material may be wound, a support for the holder, a cam having a plurality of cam tracks for moving a thread guide for guiding material to a holder, a thread guide provided with a plurality of places of attachment for a die, a die for attachment at one or other of such places and to engage one or another of the cam tracks of the cam, a guide carrier movable about an axis for supporting and guiding the thread guide and means for holding the guide carrier in and restoring it to its ordinary position whereby the thread guide can be used at different times in winding material into different forms.

5. In a winding machine, a holder whereon material may be wound, means for supporting the holder, a cam having a plurality of cam tracks for moving a thread guide for guiding material to a holder, a thread guide provided with a plurality of places of attachment for a die, a die for attachment at one or other of such places of attachment and to engage one or another of the cam tracks of the cam, a guide-carrier for supporting and guiding the thread guide and enabling it to be moved away from and toward the cam and means for holding the guide-carrier in and restoring it to its ordinary position, whereby the thread guide may be used at different times in winding material into different forms.

6. In a winding machine, a holder whereon material may be wound, a support for the holder, a cam having a plurality of cam tracks for moving a thread guide for guiding material to a holder, a thread guide provided with a plurality of places of attachment for a die, a die for attachment at one or other of such places of attachment and to engage one or another of the cam tracks of the cam, a guide-carrier movable toward and away from the cam about an axis for supporting and guiding the thread guide and enabling it to be moved away from and toward the cam and means for holding the guide carrier in and restoring it to its ordinary position, whereby the thread guide may be used at different times in winding material into different forms.

In testimony, that we claim the foregoing as our invention, we have signed our names in presence of two witnesses, this seventeenth day of October 1916.

FRANK ASHWORTH HOLT.
GRINDROD KERSHAW.

Witnesses:
WILLIAM CLUNNEHEES,
HOWARD CHEETHAM.